United States Patent
Burriss et al.

(10) Patent No.: US 10,835,052 B2
(45) Date of Patent: Nov. 17, 2020

(54) LIE-FLAT MATTRESS PAD

(71) Applicant: WestPoint Home LLC, New York, NY (US)

(72) Inventors: Martha Burriss, Clemson, SC (US); Jud Lusk, Clemson, SC (US)

(73) Assignee: WestPoint Home LLC, New York, NY (US)

( * ) Notice: Subject to any disclaimer, the term of this patent is extended or adjusted under 35 U.S.C. 154(b) by 39 days.

(21) Appl. No.: 15/355,603

(22) Filed: Nov. 18, 2016

(65) Prior Publication Data

US 2017/0354269 A1    Dec. 14, 2017

Related U.S. Application Data

(63) Continuation-in-part of application No. 29/567,827, filed on Jun. 13, 2016.

(51) Int. Cl.
*A47C 27/22* (2006.01)
*A47C 27/15* (2006.01)
*A47C 27/14* (2006.01)

(52) U.S. Cl.
CPC .......... *A47C 27/22* (2013.01); *A47C 27/148* (2013.01); *A47C 27/15* (2013.01)

(58) Field of Classification Search
CPC ... A47C 27/142; A47C 27/144; A47C 27/146; A47C 27/148; A47C 27/15; A47C 27/22; A47G 9/06; A47G 9/062; A63B 21/4037
USPC ................. 5/724, 652.1, 417, 420, 925, 926
See application file for complete search history.

(56) References Cited

U.S. PATENT DOCUMENTS

| | | | | |
|---|---|---|---|---|
| 2,788,533 A | * | 4/1957 | Bornstein | A47C 27/125 5/419 |
| 3,633,227 A | * | 1/1972 | Tegeler | A47G 9/086 5/413 R |
| 5,735,004 A | * | 4/1998 | Wooten | A41B 13/06 2/69 |
| 5,744,222 A | * | 4/1998 | Sugihara | B32B 5/16 428/196 |
| 6,393,640 B1 | * | 5/2002 | Dalis | A47C 27/005 5/497 |
| 6,842,926 B2 | * | 1/2005 | Kuo | A47C 27/085 5/654 |
| 6,961,969 B2 | * | 11/2005 | Nichols | B32B 27/12 5/420 |
| 7,069,607 B2 | * | 7/2006 | Nichols | 5/420 |
| 7,137,157 B2 | * | 11/2006 | Nichols | B32B 27/12 5/420 |
| 7,240,386 B1 | * | 7/2007 | McKay | A47C 21/044 5/423 |
| 7,350,252 B2 | * | 4/2008 | Telegadis | A47D 5/006 5/419 |

(Continued)

*Primary Examiner* — Robert G Santos
(74) *Attorney, Agent, or Firm* — Seyfarth Shaw LLP; Dean Fanelli

(57) ABSTRACT

The invention is an improved utility bedding product for use on beds or reclining chairs, particularly airplane seats. The inventive product is a multi-layered, lie-flat mattress pad that increases the comfort of passengers by providing a soft resting surface made of materials that permit the flow of air through the mattress pad. In preferred embodiments the mattress pad includes a pocket so the pad may be folded or rolled up and secured in a compact configuration for use as a pillow and for ease of transport.

43 Claims, 8 Drawing Sheets

(56) References Cited

U.S. PATENT DOCUMENTS

| | | | | |
|---|---|---|---|---|
| 7,426,767 B2* | 9/2008 | Mossbeck | A47C 27/144 | 5/652.1 |
| 7,461,894 B2* | 12/2008 | Leeds | A45C 3/00 | 297/219.1 |
| 7,467,435 B1* | 12/2008 | McKay | A47C 21/044 | 5/423 |
| 7,485,071 B2* | 2/2009 | Edwards | A63B 21/4037 | 482/23 |
| 7,650,658 B1* | 1/2010 | McKay | A47C 21/044 | 5/423 |
| 7,694,371 B2* | 4/2010 | Telegadis | A47D 15/003 | 5/655 |
| 7,789,461 B2* | 9/2010 | Leeds | A45C 3/00 | 297/219.1 |
| 7,818,842 B2* | 10/2010 | Marciano | A47C 17/64 | 441/131 |
| 7,917,403 B2* | 3/2011 | Leeds | A47C 7/021 | 297/228.1 |
| 7,950,084 B1* | 5/2011 | McKay | A47C 27/15 | 5/423 |
| 8,403,412 B2* | 3/2013 | Leeds | A47C 7/021 | 297/219.1 |
| 8,650,687 B2* | 2/2014 | Klerer | A47C 20/00 | 5/699 |
| 8,739,339 B1* | 6/2014 | McKay | A47C 27/15 | 5/423 |
| 8,997,279 B1* | 4/2015 | McKay | A47C 23/002 | 5/423 |
| 10,329,469 B2* | 6/2019 | Peterson | C09K 5/14 | |
| 2004/0077243 A1* | 4/2004 | Strongwater | B32B 5/26 | 442/247 |
| 2004/0200003 A1* | 10/2004 | Kuo | A47C 7/021 | 5/654 |
| 2004/0211005 A1* | 10/2004 | Kuo | A47C 27/085 | 5/655.5 |
| 2005/0003173 A1* | 1/2005 | Nichols | B32B 27/12 | 428/212 |
| 2005/0241067 A1* | 11/2005 | Nichols | B32B 27/12 | 5/420 |
| 2006/0162073 A1* | 7/2006 | Nichols | B32B 27/12 | 5/420 |
| 2006/0282953 A1* | 12/2006 | Telegadis | A47D 5/006 | 5/655 |
| 2007/0066467 A1* | 3/2007 | Edwards | A63B 21/4037 | 482/148 |
| 2007/0120409 A1* | 5/2007 | Leeds | A45C 3/00 | 297/423.26 |
| 2007/0179864 A1* | 8/2007 | Leeds | A47C 7/021 | 705/14.27 |
| 2007/0226911 A1* | 10/2007 | Gladney | A47C 27/148 | 5/691 |
| 2008/0060139 A1* | 3/2008 | Mossbeck | A47C 27/144 | 5/724 |
| 2008/0209640 A1* | 9/2008 | Telegadis | A47D 5/006 | 5/655.9 |
| 2009/0121529 A1* | 5/2009 | Leeds | A45C 3/00 | 297/219.1 |
| 2010/0186165 A1* | 7/2010 | Marciano | A47C 17/64 | 5/419 |
| 2011/0033686 A1* | 2/2011 | Kawka | B32B 5/022 | 428/219 |
| 2011/0162148 A1* | 7/2011 | Klerer | B65B 63/02 | 5/655.9 |
| 2011/0163581 A1* | 7/2011 | Leeds | A47C 7/021 | 297/229 |
| 2011/0314607 A1* | 12/2011 | Woolfson | A47C 27/001 | 5/636 |
| 2014/0182063 A1* | 7/2014 | Crawford | C09K 5/14 | 5/636 |
| 2014/0183403 A1* | 7/2014 | Peterson | C09K 5/14 | 252/75 |
| 2015/0074906 A1* | 3/2015 | Hiatt | A47C 31/105 | 5/484 |
| 2015/0208819 A1* | 7/2015 | McKay | A47C 23/002 | 5/423 |
| 2017/0354269 A1* | 12/2017 | Burriss | A47C 27/22 | |
| 2017/0370037 A1* | 12/2017 | Mason | D04H 1/02 | |
| 2018/0022978 A1* | 1/2018 | Peterson | C09K 5/14 | 252/75 |
| 2018/0142383 A1* | 5/2018 | Minehardt | A41D 31/0033 | |

* cited by examiner

LIE-FLAT MATTRESS PAD

CROSS-REFERENCE TO RELATED APPLICATIONS

The present patent application is a continuation-in-part of, and claims the benefit of priority under 35 U.S.C. § 120 to, U.S. patent application Ser. No. 29/567,827 filed Jun. 13, 2016, entitled "LIE-FLAT MATTRESS PAD", the entirety of which is incorporated by reference.

BACKGROUND OF THE INVENTION

Long-haul and international flights are a modern day necessity. Non-stop transoceanic and transcontinental flights often provide little opportunity for passengers to adventure beyond their assigned seats. Many airline seats may be adjusted to permit the passenger to partially recline, and some seats even permit the passenger to lie down completely horizontally. However, industrial airline seats are made to withstand thousands of hours of use and may not be ideal for passenger comfort while resting or sleeping.

It would be advantageous to develop a multi-purpose lie-flat mattress pad for use in long-haul flights that improves passenger comfort.

SUMMARY OF THE INVENTION

The invention is an improved mattress pad. The inventive mattress pad is made of multiple layers of fabric and fill to provide softness and air-flow to the user. Identical or different fabrics may be incorporated for the top and bottom of the mattress pad; the middle layer may be a single layer or may be symmetrically-configured or asymmetrically-configured component layers. It is a goal of the invention to provide a mattress pad that exhibits different air-flow characteristics to the user depending on the mattress pad orientation and therefore facilitate changes to the passenger's comfort and temperature.

It is a goal of the invention to provide a mattress pad that can lie flat on a horizontal or inclined surface. It is a further goal of the invention to provide a mattress pad with a slip-resistant surface to reduce and prevent slipping of the mattress pad on horizontal or inclined surfaces.

It is a goal of the invention to be lightweight and compact to save space on an airplane. It is a goal of the invention to serve multiple purposes including a mattress pad when placed flat and a pillow when rolled up or folded. In preferred embodiments the mattress pad includes a pocket so the pad may be secured within the pocket in a compact configuration for use as a pillow and for ease of transport. It is a goal of the invention for the mattress pad to be made of materials that are easily laundered.

These and other features, aspects and advantages of the present invention will become better understood with reference to the following description and claims.

DETAILED DESCRIPTION OF THE INVENTION

Figure 1:
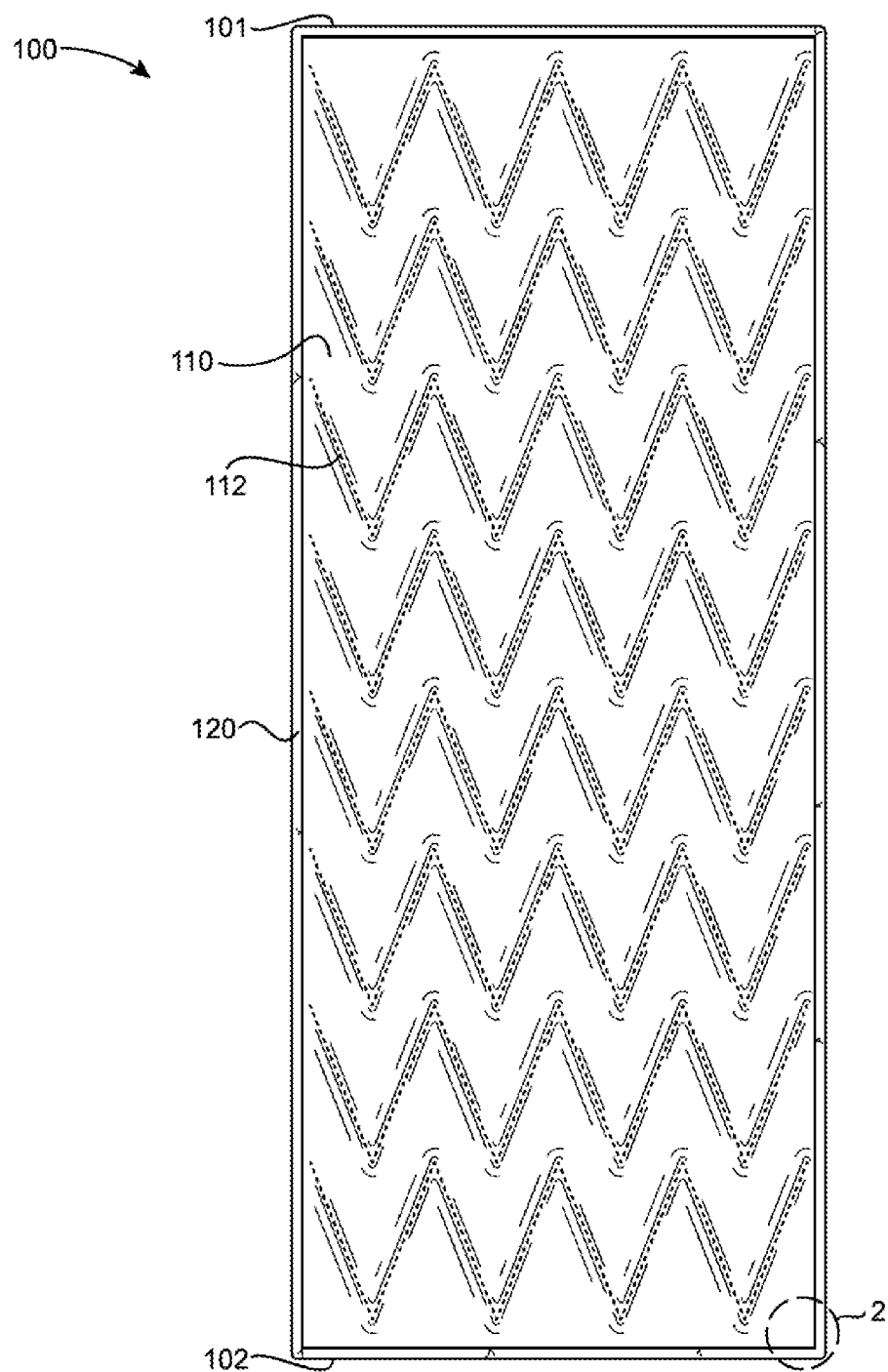
FIG. 1 is a front view of an embodiment of the inventive mattress pad, lying flat.

Embodiments of the present invention relate to improved mattress pads to enhance the user's comfort.

The inventive mattress pads are comprised of three layers—a top layer, a bottom layer, and a middle layer between the top layer and bottom layer. The top layer is preferably a polyester-based or cotton-based mesh. The bottom layer is preferably a polyester microfiber mesh. The middle layer, or fill material, is preferably one or more of a polyester batting, foam, or porous cushioning material. The layers may be secured to each other by stitching with an optional fabric binding the layer edges such as a polyester microfiber binding.

The mattress pad top layer comprises an air-permeable fabric. The top layer facilitates moving air between the user and the airline seat and aids in providing user comfort through temperature regulation. The top layer comprises at least one component layer of fabric. The top layer fabric may comprise natural or synthetic materials, or blends of natural and synthetic materials; the top layer fabric may comprise one or more of the following: cotton, silk, wool, rayon, wood cellulose, lyocell, linen, flax, hemp, jute, polyester, polyamide, nylon, polyvinyl chloride, polyethylene, polyethylene terephthalate, polyaramid, ethylene vinyl acetate, polyethylene vinyl acetate. In one embodiment the top layer comprises cotton fabric; in one embodiment the top layer is 100% cotton; in one embodiment the top layer comprises polyester fabric; in one embodiment the top layer is 100% polyester; in one embodiment the top layer is a cotton/polyester blend; in one embodiment the top layer is 60% cotton and 40% polyester by weight. In one embodiment the top layer comprises cotton mesh fabric; in one embodiment the top layer comprises polyester mesh fabric. In a preferred embodiment the top layer comprises a fabric that is between 160 grams per square meter (GSM) and 240 GSM; preferably the top layer comprises a 200 GSM 100% polyester mesh fabric. In one preferred embodiment, the top layer has a thread count between 160 and 200; in a preferred embodiment, the top layer has a thread count of 180.

The middle layer adds cushioning and support which facilitate user comfort. The middle layer comprises at least one component layer. In preferred embodiments the middle layer comprises one component layer, two component layers, three component layers, four component layers, five component layers, six component layers, seven component layers, eight component layers, nine component layers, or ten component layers. In preferred embodiments the middle layer comprises at least one component layer, at least two component layers, at least three component layers, at least four component layers, at least five component layers, at least six component layers, at least seven component layers, at least eight component layers, at least nine component layers, or at least ten component layers.

The middle layer comprises at least one resilient component layer of batting, foam, non-woven material or other cushioning material. Batting may be cotton, polyester, silk, wool, or blends thereof. In one embodiment the middle layer comprises a layer of polyester batting; in one embodiment the middle layer comprises a layer of viscoelastic polyurethane foam; in a preferred embodiment the middle layer comprises a layer of polyester batting and a layer of memory foam. In one embodiment the middle layer is comprised of intertwined thermoplastic filament or thread, for example, 100% polyethylene cushions by Airweave (Tokyo, JP). In a preferred embodiment the batting layer facilitates movement and distribution of air between the user and the seat; in a preferred embodiment the memory foam layer has transverse holes formed in the foam or punched through the foam to allow air movement through the memory foam layer.

In one embodiment the middle layer comprises a polyester bonded batting that is between 60 GSM and 230 GSM; the polyester bonded batting may have a density of 60 GSM, 65 GSM, 70 GSM, 75 GSM, 80 GSM, 85 GSM, 90 GSM, 95 GSM, 100 GSM, 105 GSM, 110 GSM, 115 GSM, 120 GSM, 125 GSM, 130 GSM, 135 GSM, 140 GSM, 145 GSM, 150 GSM, 155 GSM, 160 GSM, 165 GSM, 170 GSM, 175 GSM, 180 GSM, 185 GSM, 190 GSM, 195 GSM, 200 GSM, 205 GSM, 210 GSM, 215 GSM, 220 GSM, 225 GSM, or 230 GSM. In a preferred embodiment the polyester bonded batting has a density that is between 150 GSM and 230 GSM; preferably the middle layer comprises a 190 GSM polyester bonded batting. In one preferred embodiment the polyester bonded batting has a density that is between 60 GSM and 140 GSM; preferably the middle layer comprises a 100 GSM polyester bonded batting.

In a preferred embodiment the middle layer comprises a polyester non-woven fabric; the polyester non-woven fabric may have a density of 40 GSM, 45 GSM, 50 GSM, 55 GSM, 60 GSM, 65 GSM, 70 GSM, 75 GSM, 80 GSM, 85 GSM, 90 GSM, 95 GSM, 100 GSM, 105 GSM, 110 GSM, 115 GSM, or 120 GSM. In a preferred embodiment the polyester non-woven fabric is between 40 GSM and 120 GSM; in a preferred embodiment the polyester non-woven fabric is 80 GSM.

In a preferred embodiment the middle layer comprises a foam such as polyurethane foam, viscoelastic polyurethane foam (memory foam), or latex foam. Viscoelastic polyurethane foam may have slow or fast recovery characteristics when recovering from deformation. In a preferred embodiment the middle layer comprises a memory foam with a density from about 10 D to about 100 D; preferably the density is 10 D, 20 D, 30 D, 40 D, 50 D, 60 D, 70 D, 80 D, 90 D, or 100 D; most preferably the density is 40 D. The thickness of the memory foam is preferably between about 1.5 mm and about 25 mm; the thickness of the memory foam is preferably about 1.5 mm, 2.0 mm, 2.5 mm, 3.0 mm, 3.5 mm, 4.0 mm, 4.5 mm, 5.0 mm, 5.5 mm, 6.0 mm, 6.5 mm, 7.0 mm, 7.5 mm, 8.0 mm, 8.5 mm, 9.0 mm, 9.5 mm, 10.0 mm, 10.5 mm, 11.0 mm, 11.5 mm, 12.0 mm, 12.5 mm, 13.0 mm, 13.5 mm, 14.0 mm, 14.5 mm, 15.0 mm, 15.5 mm, 16.0 mm, 16.5 mm, 17.0 mm, 17.5 mm, 18.0 mm, 18.5 mm, 19.0 mm, 19.5 mm, 20.0 mm, 20.5 mm, 21.0 mm, 21.5 mm, 22.0 mm, 22.5 mm, 23.0 mm, 23.5 mm, 24.0 mm, 24.5 mm, or 25.0 mm. In a preferred embodiment the thickness of the memory foam is about 6.5 mm. In a preferred embodiment the memory foam has holes through the thickness of the layer; in one embodiment the holes are organized in a patterned formation; in one embodiment the holes are randomly positioned. Holes in the foam layer may be formed at the time of the foam layer's production or may be punched through the foam layer post-production.

In a preferred embodiment the middle layer comprises a siliconized polyester batting that is between 145 GSM and 310 GSM; the siliconized polyester batting may have a density of 145 GSM, 150 GSM, 155 GSM, 160 GSM, 165 GSM, 170 GSM, 175 GSM, 180 GSM, 185 GSM, 190 GSM, 195 GSM, 200 GSM, 205 GSM, 210 GSM, 215 GSM, 220 GSM, 225 GSM, 230 GSM, 235 GSM, 240 GSM, 245 GSM, 250 GSM, 255 GSM, 260 GSM, 265 GSM, 270 GSM, 275 GSM, 280 GSM, 285 GSM, 290 GSM, 295 GSM, 300 GSM, 305 GSM, or 310 GSM. Preferably the middle layer comprises a 185 GSM siliconized polyester bonded batting; preferably the middle layer comprises a 270 GSM siliconized polyester bonded batting.

In one embodiment the middle layer is comprised of intertwined thermoplastic filament or thread between about 6.5 mm and about 38 mm; the thickness of the intertwined thermoplastic is preferably about 6.5 mm, 7.0 mm, 7.5 mm, 8.0 mm, 8.5 mm, 9.0 mm, 9.5 mm, 10.0 mm, 10.5 mm, 11.0 mm, 11.5 mm, 12.0 mm, 12.5 mm, 13.0 mm, 13.5 mm, 14.0 mm, 14.5 mm, 15.0 mm, 15.5 mm, 16.0 mm, 16.5 mm, 17.0 mm, 17.5 mm, 18.0 mm, 18.5 mm, 19.0 mm, 19.5 mm, 20.0 mm, 20.5 mm, 21.0 mm, 21.5 mm, 22.0 mm, 22.5 mm, 23.0 mm, 23.5 mm, 24.0 mm, 24.5 mm, 25.0 mm, 25.5 mm, 26.0 mm, 26.5 mm, 27.0 mm, 27.5 mm, 28.0 mm, 28.5 mm, 29.0 mm, 29.5 mm, 30.0 mm, 30.5 mm, 31.0 mm, 31.5 mm, 32.0 mm, 32.5 mm, 33.0 mm, 33.5 mm, 34.0 mm, 34.5 mm, 35.0 mm, 35.5 mm, 36.0 mm, 36.5 mm, 37.0 mm, 37.5 mm, or 38.0 mm. Preferably the intertwined thermoplastic filament or thread layer is between about 19.0 mm and about 25.5 mm.

The mattress pad bottom layer comprises an air-permeable fabric. The bottom layer comprises at least one component layer. The bottom layer fabric may comprise natural or synthetic materials, or blends of natural and synthetic materials; the bottom layer fabric may comprise one or more of the following: cotton, silk, wool, rayon, wood cellulose, lyocell, linen, flax, hemp, jute, polyester, polyamide, nylon, polyvinyl chloride, polyethylene, polyethylene terephthalate, polyaramid, ethylene vinyl acetate, polyethylene vinyl acetate. In one embodiment the bottom layer comprises cotton fabric; in one embodiment the bottom layer is 100% cotton; in one embodiment the bottom layer comprises polyester fabric; in one embodiment the bottom layer is 100% polyester; in one embodiment the bottom layer is a cotton/polyester blend; in one embodiment the bottom layer is 60% cotton and 40% polyester by weight. In one embodiment the bottom layer comprises polyester fabric; preferably the bottom layer comprises polyester microfiber. In one embodiment the bottom layer comprises polyester mesh fabric. In a preferred embodiment the bottom layer comprises a fabric that is between 60 GSM and 110 GSM; preferably the bottom layer comprises an 85 GSM 100% polyester microfiber fabric. In one preferred embodiment, the bottom layer has a thread count between 160 and 200; in a preferred embodiment, the bottom layer has a thread count of 180.

In a preferred embodiment the outside surface of the bottom layer is treated with a slip-resistant material to reduce or eliminate movement between the mattress pad and the airline seat or other surface upon which the mattress pad is laid. Patterns of a slip-resistant material such as lines, waves, dots, grids, or geometric shapes may be added to the outside surface of the bottom layer. The slip-resistant material increases friction between the mattress pad and the surface upon which it is placed, for example leather or plastic of an airline seat, and so movement of the mattress pad is resisted against the application of an exterior force.

The slip-resistant material may be a polymer, such as vinyl, and more preferably an elastomer. The slip-resistant material may be applied to the bottom layer before the mattress pad layers are secured to form the final mattress pad or may be applied to the exterior surface of the bottom layer after the mattress pad layers have been secured together. The slip-resistant material may be applied by appropriate printing, spraying, painting, or screening methods.

The top, middle, and bottom layers are secured together to form the mattress pad. In a preferred embodiment the layers are quilted together. Quilting is preferred as it creates pockets in the mattress pad for loft and air flow. Quilt stitches using straight lines or free motion may be used; examples of quilt stitches include parallel lines, horizontal lines, diagonal lines, curvilinear lines, crosshatch patterns, chevron design, onion design, geometric shapes, diamonds, triangles, squares, trapezoids, parallelograms, rectangles, hexagons, circles, ovals, spirals, zig-zags, repeating or non-repeating patterns thereof, or combination thereof. Preferably the layers are secured together with a chevron or diamond quilt stitch.

Additional transverse stitching may be included in the mattress pad to facilitate, for example, laundry processing, packing, and/or storage. Lines may be quilt stitched across the width of the mattress pad to facilitate folding of the mattress pad. The mattress pad may have one or more than one transverse stitch line; the mattress pad may have 1, 2, 3, 4, 5, 6, 7, 8, 9, or 10 transverse stitch lines. Transverse stitch lines may be evenly distributed along the mattress length or may be at variable intervals. In one embodiment a single stitch line is positioned at the halfway point between the mattress pad top edge and bottom edge to facilitate folding the mattress pad in half; in one embodiment stitch lines are positioned at the ⅓ and ⅔ points between the mattress pad top edge and bottom edge to facilitate folding the mattress pad in thirds; in one embodiment stitch lines are positioned at the ¼, ½, and ¾ points between the mattress pad top edge and bottom edge to facilitate folding the mattress pad in quarters. In one embodiment stitch lines are positioned at intervals corresponding to the length of the pocket; in one embodiment where the pocket length is 20% of the length of the mattress pad, stitch lines are positioned at the 20%, 40%, 60%, and 80% points between the mattress pad top edge and bottom edge. Transverse stitch lines may be included in the mattress pad regardless of whether the mattress pad includes a pocket. The presence of transverse stitch lines does not adversely impact the rollability of the mattress pad.

Optional fabric binding may be used around the perimeter of the mattress pad to secure the layers together. In one embodiment the fabric binding comprises the same material as the top layer; in one embodiment the fabric binding comprises the same material as the bottom layer. In a preferred embodiment binding comprises a fabric that is between 130 GSM and 210 GSM; preferably the fabric may be 130 GSM, 135 GSM, 140 GSM, 145 GSM, 150 GSM, 155 GSM, 155 GSM, 160 GSM, 165 GSM, 170 GSM, 175 GSM, 180 GSM, 185 GSM, 190 GSM, 195 GSM, 200 GSM, 205 GSM, or 210 GSM; preferably the binding comprises a 170 GSM polyester fabric.

Preferred mattresses of the invention have a cotton top layer and a polyester microfiber bottom layer, however, cotton/polyester blends may be used. For example, a top layer may be made of a cotton and polyester blend having 60% cotton and 40% polyester by weight. In one embodiment, the top layer is made of a cotton/polyester blend where the warp comprises cotton yarns and the weft comprises polyester yarns.

Optionally the mattress pad has a pocket at one end that is built into the outside surface of the bottom layer. The pocket is preferably made of a flexible mesh fabric that is open on one side. The mattress pad may be stored inside this pocket folding the mattress pad or by rolling it up from the opposite end then tucking the pad inside of the pocket; in one embodiment the mesh pocket may be pulled around the mattress pad to secure the pad within the pocket. With the optional pocket incorporated into the construction of the mattress pad, the need for a separate storage pouch or device is eliminated. The pocket width spans the width of the mattress pad; the pocket length is between about 10% and about 33% of the length of the mattress pad; more preferably the pocket length is between about 15% and about 20% of the length of the mattress pad. Preferably the pocket length is 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, or 33% of the length of the mattress pad; in a preferred embodiment the pocket length is 16% of the length of the mattress pad. The pocket length may be adjusted based on the fabric of the pocket—a fabric having little potential for stretch may need to be a larger % of the length of the mattress pad compared with a fabric having a large potential for stretch. In one embodiment the pocket is made of a high-stretch material and has a length less than 16% of the length of the mattress pad; in one embodiment the pocket is made of a low-stretch material and has a length of more than 16% of the length of the mattress pad.

When the mattress pad is rolled up and secured in the optional pocket, the product may be stored securely and easily for travel. The rolled-up mattress pad may be used as a pillow, for example, a neck roll pillow, a lumbar support pillow, or side support pillow.

Mattress pad size may be chosen to accommodate specific surface sizes or user sizes. Preferred embodiments are sized to cover at least a portion of an airplane seat. Preferred embodiments have widths between about 380 mm and about 1140 mm, and lengths between about 1200 mm and about 2400 mm. One preferred embodiment has a width of about 500 mm and a length of about 1270 mm; another preferred embodiment has a width of about 610 mm and a length of about 1524 mm; another preferred embodiment has a width of about 1040 mm and a length of about 1960 mm.

Mattress pad thickness is dependent upon the thickness of the component layers. The majority of mattress pad thickness will come from the cushioning middle layer. The thickness of the mattress pad is preferably between about 5 mm to about 80 mm; preferably the mattress pad thickness is about 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, 30 mm, 31 mm, 32 mm, 33 mm, 34 mm, 35 mm, 36 mm, 37 mm, 38 mm, 39 mm, 40 mm, 41 mm, 42 mm, 43 mm, 44 mm, 45 mm, 46 mm, 47 mm, 48 mm, 49 mm, 50 mm, 51 mm, 52 mm, 53 mm, 54 mm, 55 mm, 56 mm, 57 mm, 58 mm, 59 mm, 60 mm, 61 mm, 62 mm, 63 mm, 64 mm, 65 mm, 66 mm, 67 mm, 68 mm, 69 mm, 70 mm, 71 mm, 72 mm, 73 mm, 74 mm, 75 mm, 76 mm, 77 mm, 78 mm, 79 mm, or 80 mm.

The mattress pad may be constructed so that the cross-section of the mattress pad appears to be the same whether oriented with the top layer facing upwards or downwards. Such "symmetrical" construction would provide the user with the same air flow characteristics regardless of whether the mattress pad is oriented with the top layer facing the user or with the bottom layer facing the user. Symmetrical construction also facilitates mattress pad construction by eliminating the need for unique order of materials from top layer through to bottom layer. In one embodiment of symmetrical construction, the top layer and bottom layer are made of the same fabric; in a preferred embodiment the top layer and bottom layer are comprised of 85 GSM polyester microfiber fabric with a thread count of 180. In one embodiment of symmetrical construction, the middle layer comprises a single layer (layer Z); in another embodiment of symmetrical construction the middle layer comprises an odd number of component layers (layer Y-layer Z-layer Y); in another embodiment of symmetrical construction the middle layer comprises an even number of component layers (layer Y-layer Z-layer Z-layer Y). In one embodiment of symmetrical construction the middle layer is a single layer of viscoelastic polyurethane foam (memory foam) having a density of 40 D with perforated holes; in one embodiment of symmetrical construction the middle layer is comprised of three component layers—a layer of viscoelastic polyurethane foam (memory foam) having a density of 40 D with perforated holes sandwiched between two layers each made of 190 GSM polyester bonded batting.

In a preferred embodiment the mattress pad is constructed so that the cross-section of the mattress pad appears different whether oriented with the top layer facing upwards or downwards. This "asymmetrical" construction would provide the user with different air flow characteristics and comfort depending on whether the mattress pad is oriented with the top layer facing the user or with the bottom layer facing the user. Asymmetrical construction may be accomplished by (1) utilizing different materials for the top layer and bottom layer with symmetrically-configured middle layer; (2) utilizing different materials for the top layer and bottom layer with asymmetrically-configured middle layer; or (3) utilizing the same materials for the top layer and bottom layer with asymmetrically-configured middle layer. For asymmetric construction, if the top layer and bottom layer are made of the same material then the middle layer must be asymmetrically-configured.

In one embodiment of asymmetrical construction, the top layer is different from the bottom layer, and the middle layer comprises a single layer (layer Z); in another embodiment of asymmetrical construction the top layer is different from the bottom layer, and the middle layer comprises an odd number of component layers (layer Y-layer Z-layer Y); in another embodiment of asymmetrical construction the top layer is different from the bottom layer and the middle layer comprises an even number of component layers (layer Y-layer Z-layer Z-layer Y). In one embodiment of asymmetrical construction the top layer is different from the bottom layer, and the middle layer comprises an odd number of component layers (layer X-layer Y-layer Z); in another embodiment of asymmetrical construction the top layer is different from the bottom layer and the middle layer comprises an even number of component layers (layer Y-layer Z-layer Y-layer Z). In one embodiment of asymmetrical construction the top layer is the same as the bottom layer, and the middle layer comprises an odd number of component layers (layer X-layer Y-layer Z); in another embodiment of asymmetrical construction the top layer is the same as the bottom layer and the middle layer comprises an even number of component layers (layer Y-layer Z-layer Y-layer Z).

Preferred mattress pads of the invention have asymmetric construction. Preferred mattress pads utilize different fabrics for the top layer and bottom layer along with an asymmetrically-configured middle layer comprising at least two component layers; preferred mattress pads utilize different fabrics for the top layer and bottom layer along with an asymmetrically-configured middle layer comprising at least three component layers. Preferred mattress pads of the invention utilize different fabrics for the top layer and bottom layer along with an asymmetrically-configured middle layer comprising at least three component layers, one layer of which comprises viscoelastic polyurethane foam and one layer of which comprises polyester batting.

Figure 2:
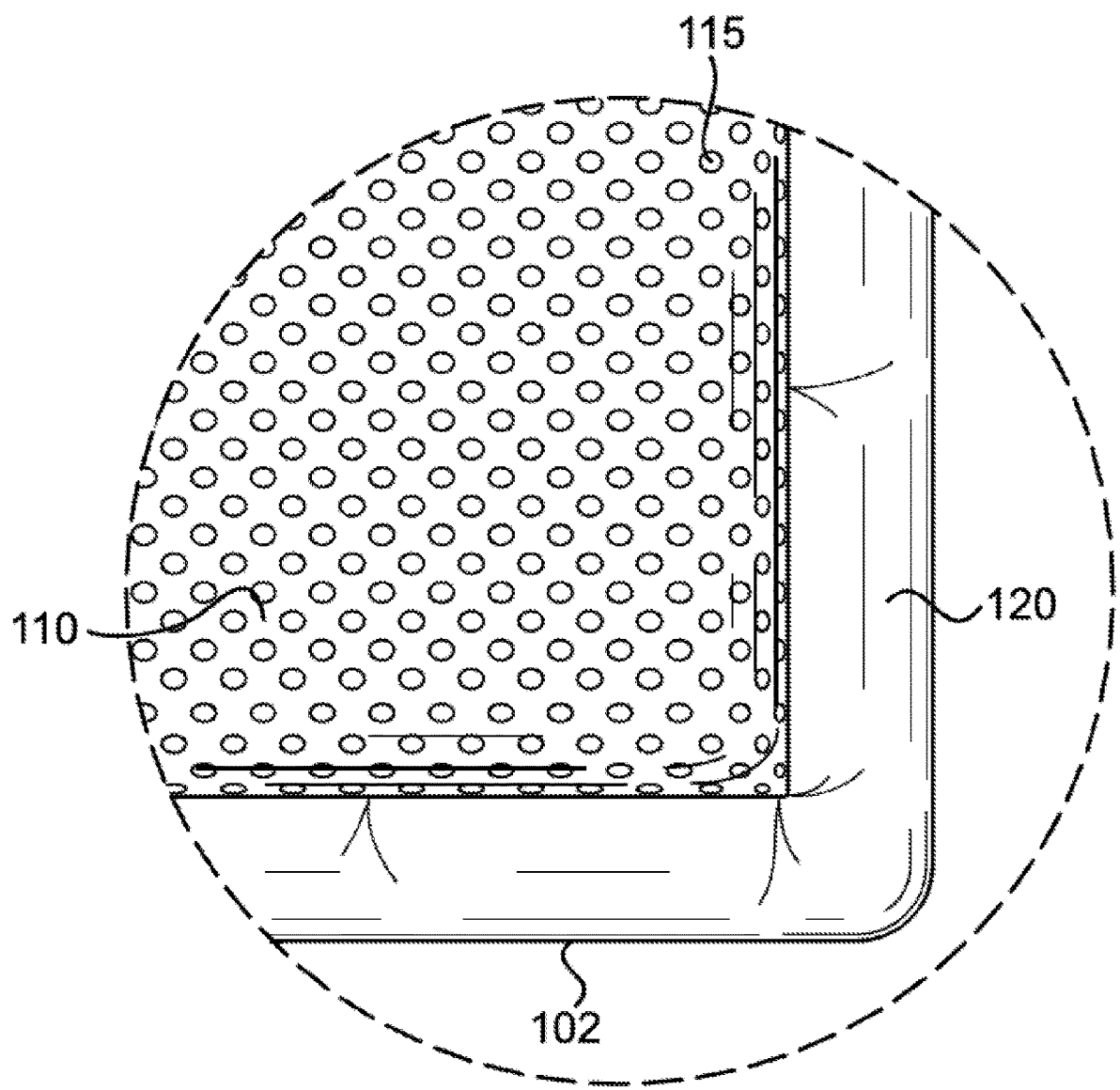
FIG. 2 is a detail of the bottom corner of the front view of the inventive mattress pad depicted in FIG. 1.

FIGS. 1-8 depict a mattress pad 100 from several view points and in several configurations. Front view of mattress pad 100 lying flat is shown in FIG. 1 with top layer 110. Chevron quilt stitch 112 is shown running across the width of the mattress pad top layer. The mattress pad top edge is depicted at edge 101 and the bottom edge is depicted at the opposite edge 102. Fabric binding 120 is secured around the entire perimeter of mattress pad 100. FIG. 2 shows a detail of the bottom right corner of mattress pad 100 from FIG. 1. Top layer 110 is made of a polyester mesh having holes 115.

Figure 3:
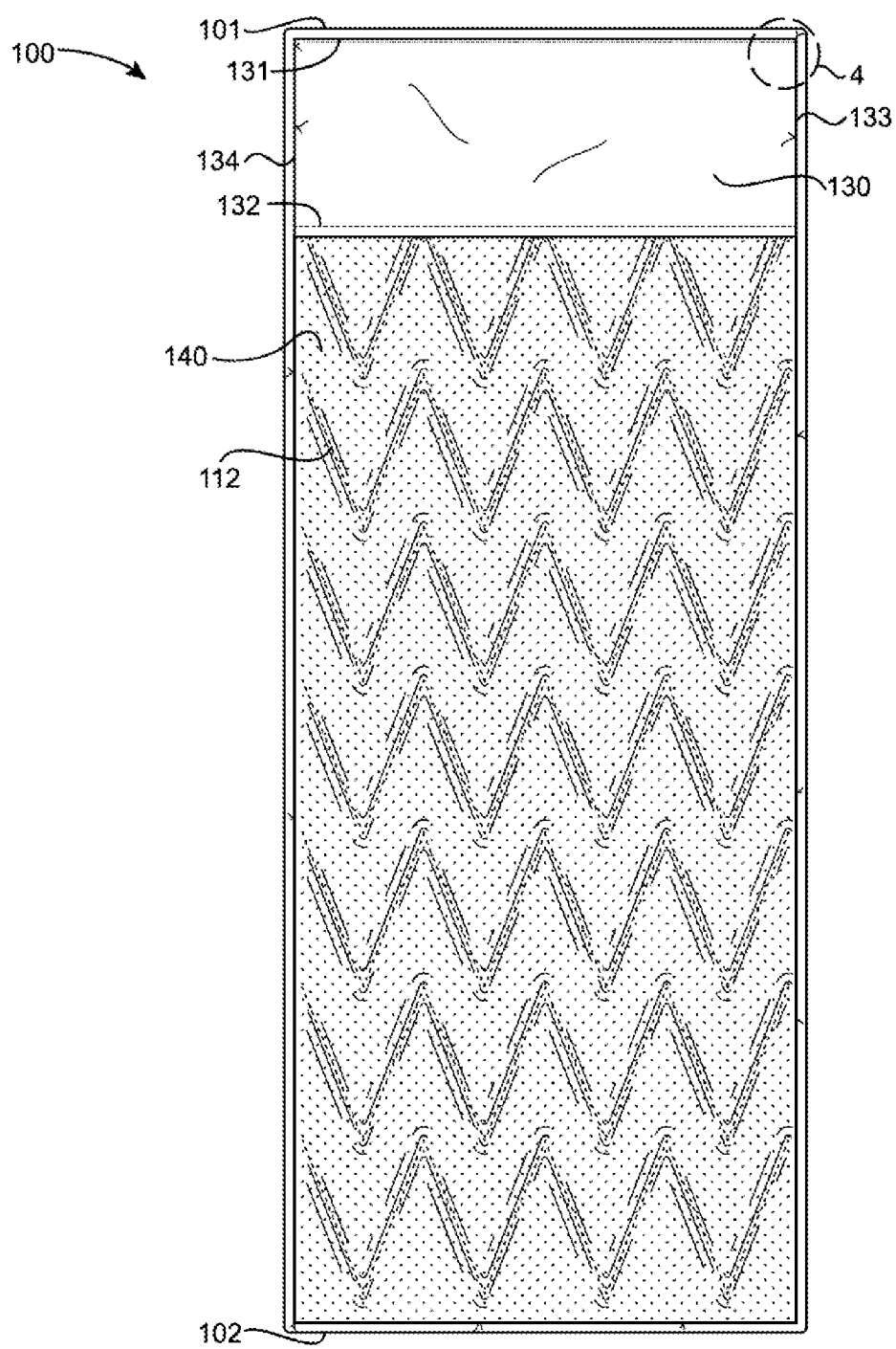
FIG. 3 is a back view of the inventive mattress pad of FIG. 1, lying flat.
Figure 4:
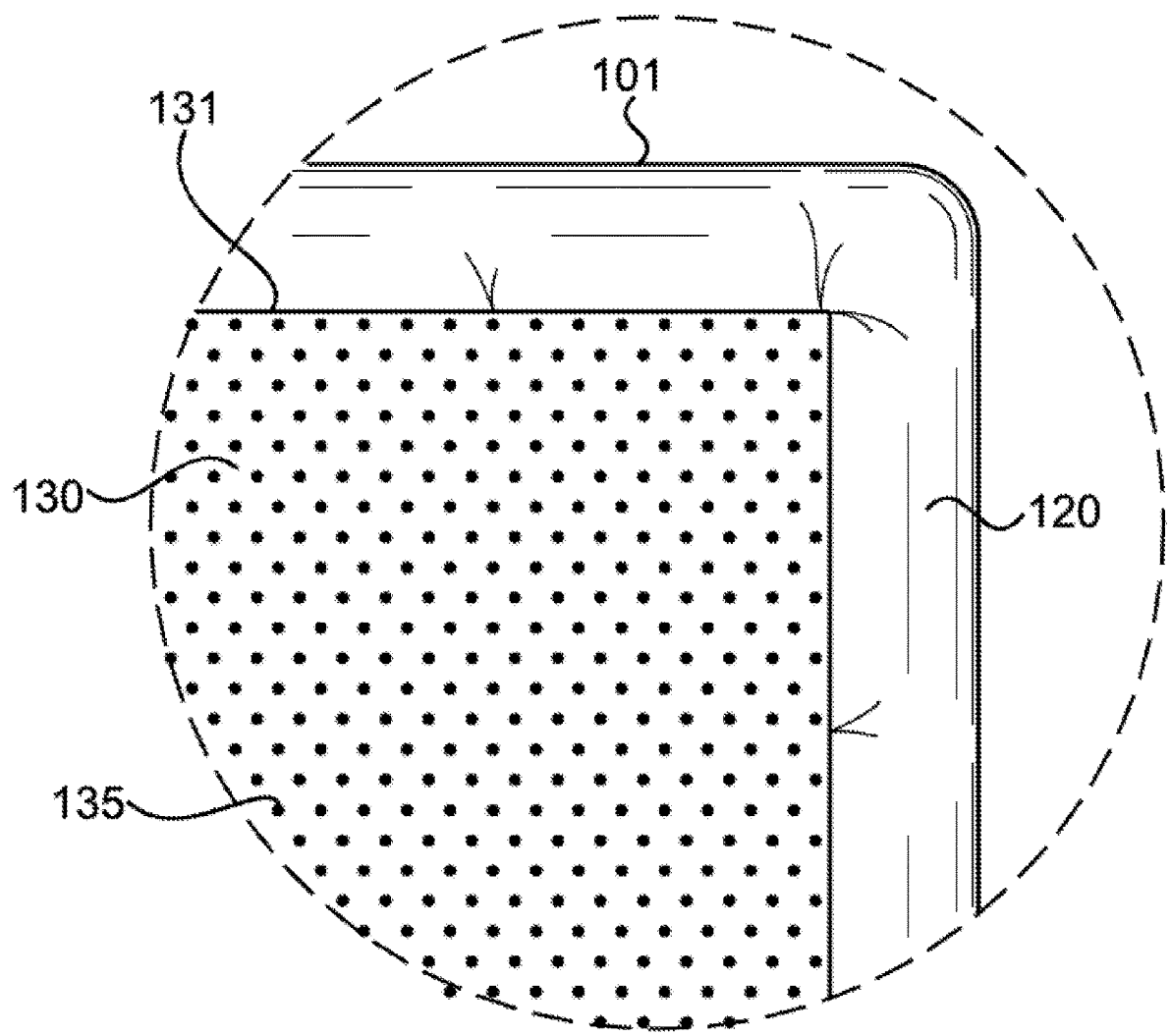
FIG. 4 is a detail of the top corner of the back view of the inventive mattress pad depicted in FIG. 3.

Back view of mattress pad 100 lying flat is shown in FIG. 3 with bottom layer 140. Chevron quilt stitch 112 is shown running across the width of the mattress pad bottom layer. Pocket 130 is shown at top edge 101. Pocket 130 is stitched to the mattress pad 100 at three edges: top edge 131 and side edges 133 and 134. Pocket 130 is open at edge 132 to allow mattress pad 100 to be rolled up and secured within pocket 130. FIG. 4 shows a detail of the top right corner of mattress pad 100 from FIG. 3. Pocket 130 is made of a stretch mesh tuck having holes 135.

Figure 5:
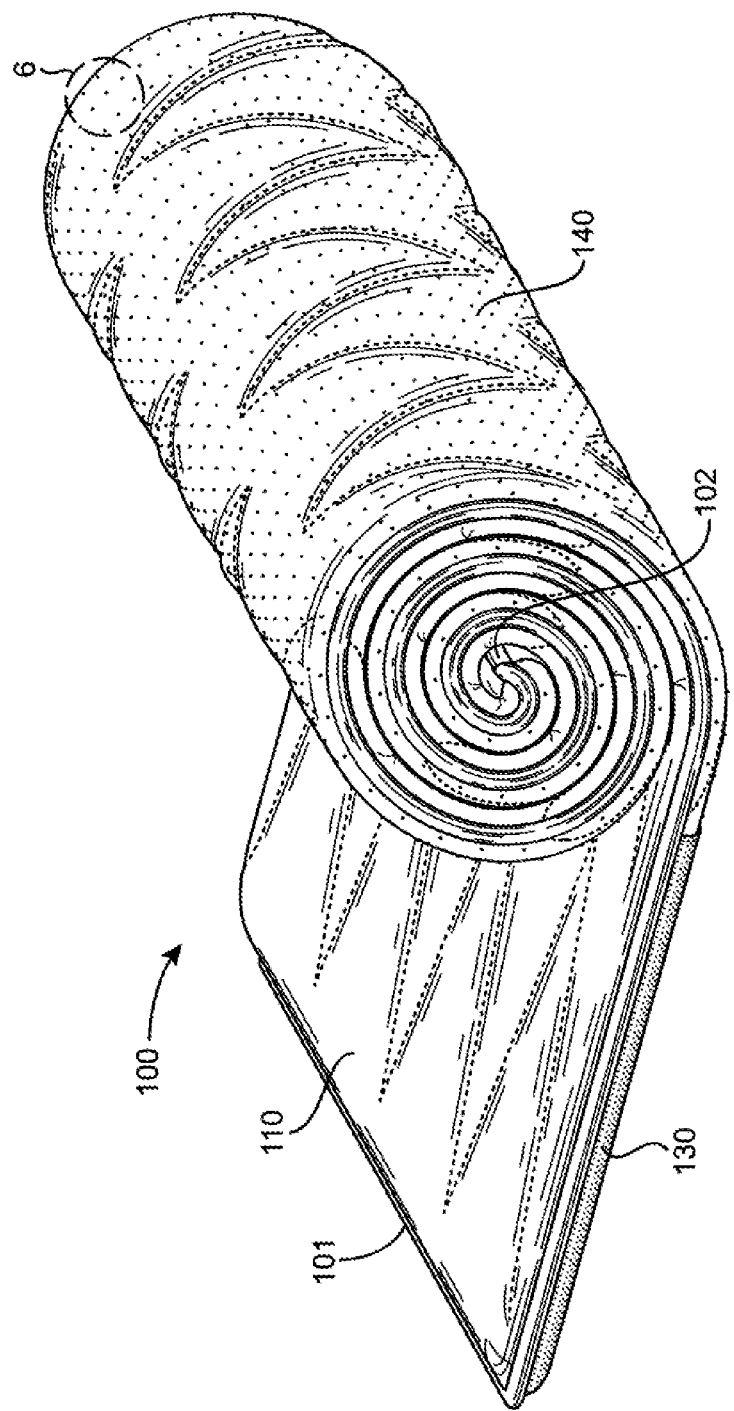
FIG. 5 is a perspective view of the inventive mattress pad depicted in FIG. 1, partially rolled up.
Figure 6:
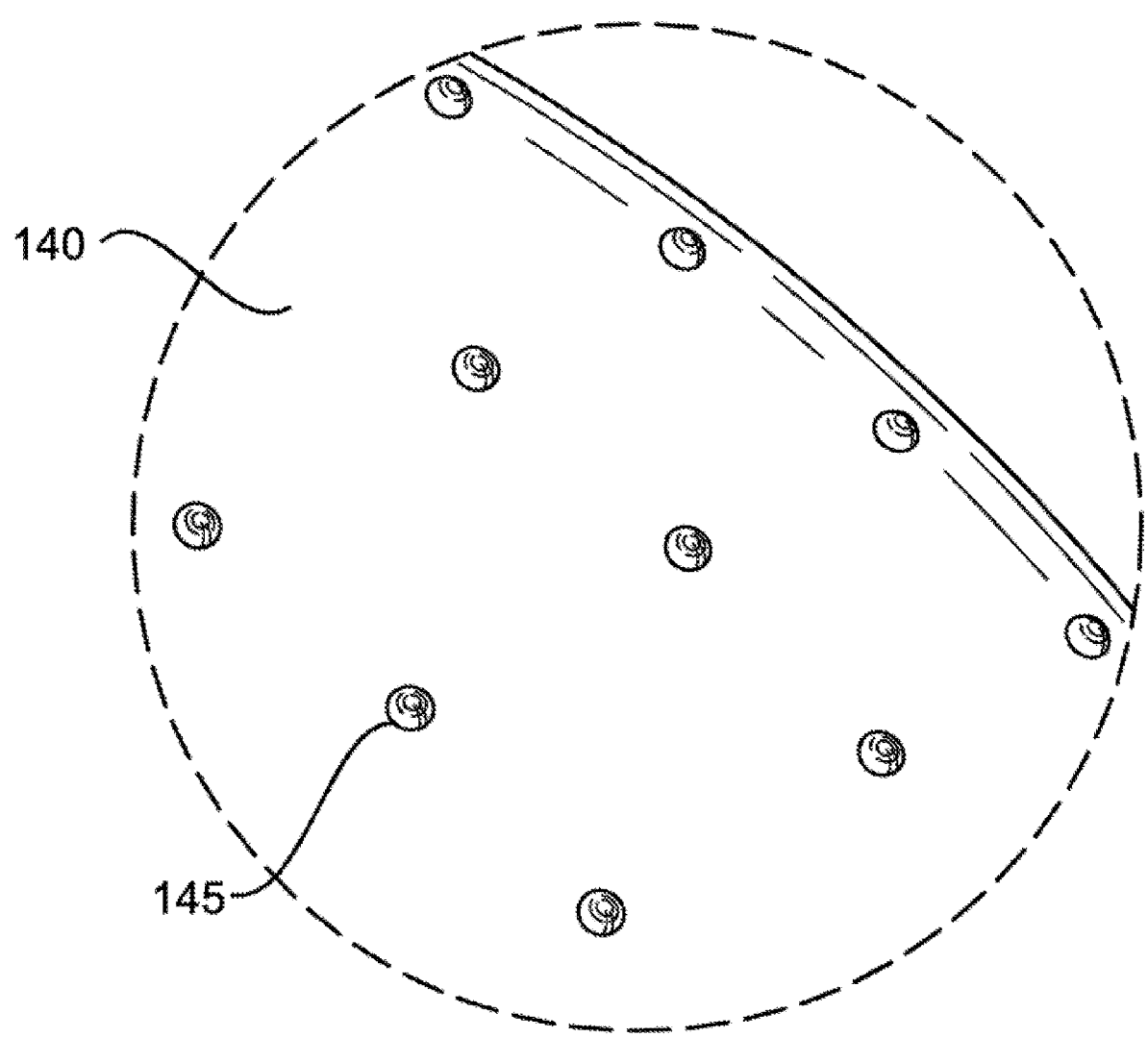
FIG. 6 is a detail of the back side of the inventive mattress pad depicted in FIG. 5.

Mattress pad 100 is shown in FIG. 5 partially rolled-up in a perspective view. Bottom edge 102 is at the center of the roll as the mattress pad is rolled toward pocket 130. FIG. 6 shows a detail of the bottom layer 140 of mattress pad 100 from FIG. 5. Bottom layer 140 is made of a polyester microfiber fabric with slip-resistant pattern of polymeric dots 145 across the exterior surface of bottom layer 140.

Figure 7:
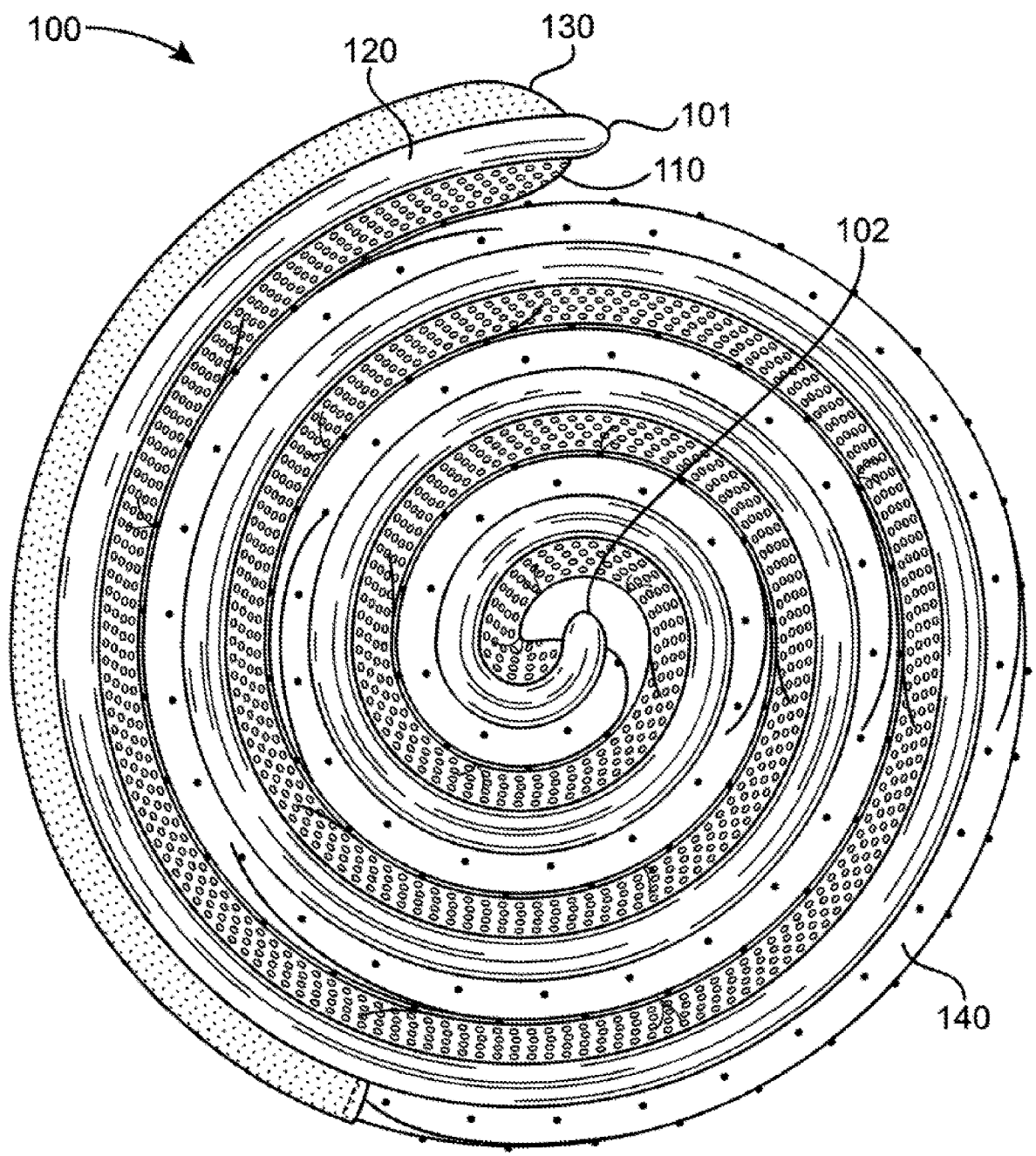
FIG. 7 is a left side view of the inventive mattress pad depicted in FIG. 1, rolled-up.
Figure 8:
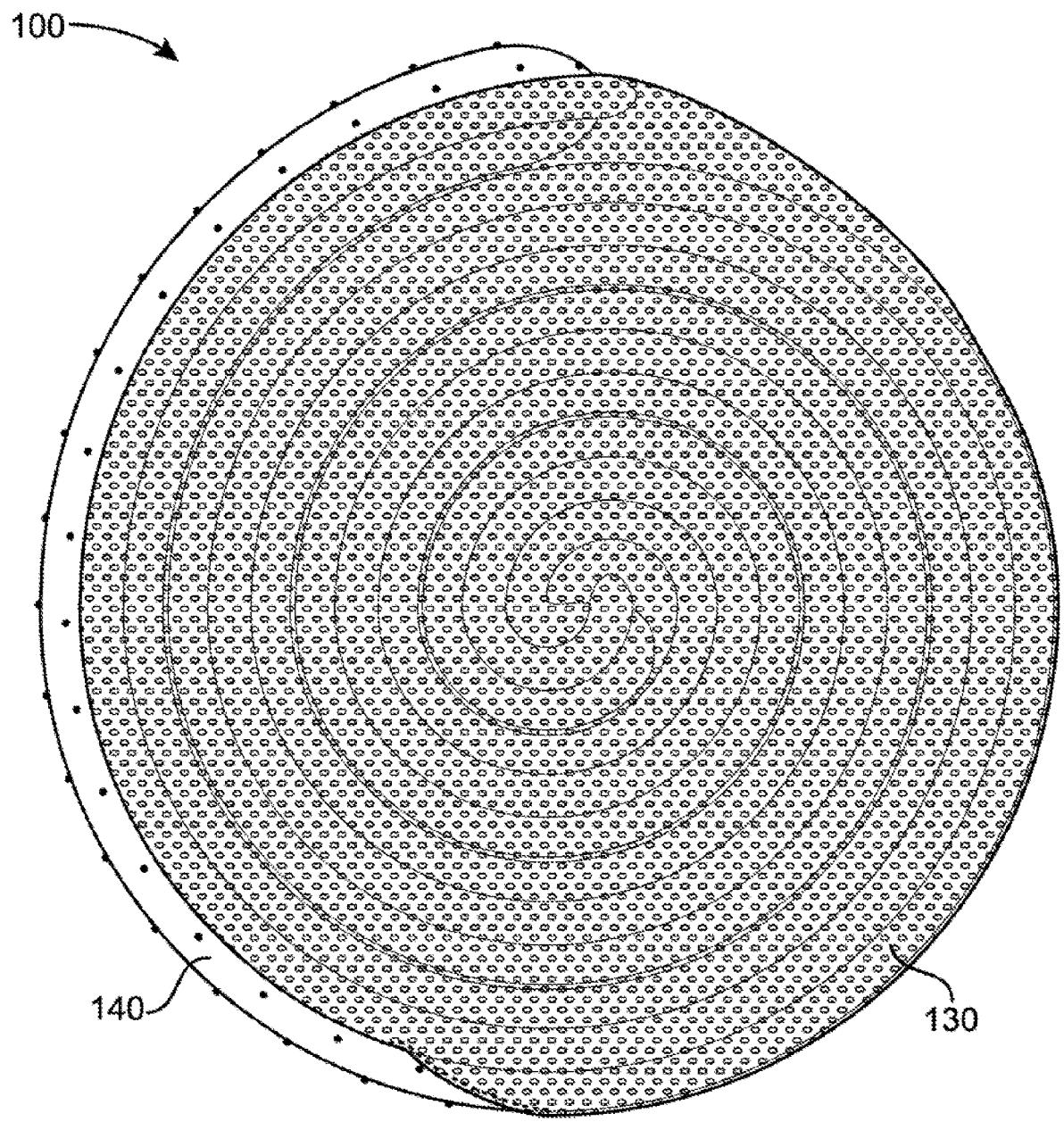
FIG. 8 is a left side view of the inventive mattress pad depicted in FIG. 1, rolled-up and contained within the pocket.

A side view of mattress pad 100 fully rolled-up is depicted in FIG. 7. Bottom edge 102 is at the center of the roll and top edge 101 is on the outside of the roll. A side view of mattress pad 100 fully rolled-up and contained within pocket 130 is depicted in FIG. 8.

While the present inventions have been illustrated and described in many embodiments of varying scope, it will at once be apparent to those skilled in the art that variations may be made within the spirit and scope of the inventions. Accordingly, it is intended that the scope of the inventions set forth in the appended claims not be limited by any specific wording in the foregoing description, except as expressly provided.

EXAMPLES

Example 1

The following example is meant to be illustrative and prophetic only. In this example a mattress pad is constructed of a top layer, a middle layer comprised of four component layers, and a bottom layer.

The top layer comprises 200 GSM 100% polyester mesh fabric.

The middle layer comprises (1) a first component layer made of 190 GSM polyester batting positioned adjacent to the mattress pad top layer and adjacent to (and above) the second component layer; (2) a second component layer made of 80 GSM polyester non-woven fabric positioned adjacent to (and below) the first component layer and adjacent to (and above) the third component layer; (3) a third component layer made of 6.5 mm thick memory foam having a density of 40 D with perforated holes positioned adjacent to (and below) the second component layer and adjacent to (and above) the fourth component layer; and (4) a fourth component layer made of 185 GSM siliconized polyester bonded batting positioned adjacent to (and below) the third component layer and adjacent to the mattress pad bottom layer.

The bottom layer comprises 85 GSM 100% polyester microfiber fabric having a thread count of 180. The bottom layer further includes a repeating pattern of elastomeric dots on the outside surface as a slip-resistant backing.

The layers are quilted together with a chevron quilt stitch. A 170 GSM polyester microfiber binding is used around the perimeter of the mattress pad to provide a 10 mm border.

A stretch mesh tuck pocket is secured to the mattress pad at the top end of the bottom layer. The pocket is stitched on three sides—the top side, left side, and right side—so as to leave the bottom of the pocket open to receive the rolled-up mattress pad. The pocket spans the entire width of the mattress pad, and is about 16% of the length of the mattress pad.

Example 2

The following example is meant to be illustrative and prophetic only. In this example a mattress pad is constructed of a top layer, a middle layer comprised of three component layers, and a bottom layer.

The top layer comprises 200 GSM 100% polyester mesh fabric.

The middle layer comprises (1) a first component layer made of 100 GSM polyester batting and positioned adjacent to the mattress pad top layer and adjacent to (and above) the second component layer; (2) a second component layer made of 6.5 mm thick memory foam having a density of 40 D with perforated holes positioned adjacent to (and below) the first component layer and adjacent to (and above) the third component layer; and (3) a third component layer made of 270 GSM polyester batting positioned adjacent to (and below) the second component layer and adjacent to the mattress pad bottom layer.

The bottom layer comprises 85 GSM 100% polyester microfiber fabric having a thread count of 180. The bottom layer further includes a repeating pattern of elastomeric dots on the outside surface as a slip-resistant backing.

The layers are quilted together with a chevron quilt stitch. A polyester microfiber binding is used around the perimeter of the mattress pad.

What is claimed is:

1. A mattress pad comprising:
   a top layer comprised of a first fabric;
   a back layer comprised of a second fabric; and
   a middle layer disposed between said top layer and said back layer;
   wherein said middle layer comprises a first component layer made of a first cushioning material, a second component layer made of a second cushioning material, and a third component layer made of a third cushioning material;
   wherein the first component layer is adjacent to the top layer and the second component layer, the second component layer is adjacent to the first component layer and the third component layer, and the third component layer is adjacent to the second component layer and the back layer; and
   wherein said second cushioning material consists of perforated viscoelastic polyurethane foam having perforation holes positioned adjacent to the first component layer and adjacent to the third component layer, wherein said foam is of uniform density and thickness; and
   wherein said second component layer has a thickness substantially less than the thickness of the first component layer or the thickness of the third component layer.

2. A mattress pad of claim 1 wherein said first fabric is a polyester mesh fabric.

3. A mattress pad of claim 2 wherein said first fabric is a 200 GSM 100% polyester mesh fabric.

4. A mattress pad of claim 1 wherein said second fabric is a polyester microfiber fabric.

5. A mattress pad of claim 4 wherein said second fabric is an 85 GSM 100% polyester microfiber fabric having a thread count of 180.

6. A mattress pad of claim 1 wherein said first fabric and said second fabric are both polyester microfiber fabrics.

7. A mattress pad of claim 1 wherein at least one component layer of said middle layer comprises polyester batting.

8. A mattress pad of claim 1 wherein at least one transverse stitch line is placed across the width of the mattress pad to facilitate folding of said mattress pad.

9. A mattress pad of claim 1 wherein the first cushioning material is polyester batting.

10. A mattress pad of claim 9 wherein the third cushioning material is siliconized polyester bonded batting.

11. A mattress pad of claim 9 wherein the third cushioning material is polyester batting.

12. A mattress pad of claim 1 wherein said mattress pad is sized to fit to an airplane seat.

13. A mattress pad of claim 12 wherein at least one transverse stitch line is placed across the width of the mattress pad to facilitate folding of said mattress pad.

14. A mattress pad of claim 1 wherein said first fabric is a 200 GSM 100% polyester mesh fabric and wherein said second fabric is an 85 GSM 100% polyester microfiber fabric having a thread count of 180.

15. A mattress pad of claim 1 wherein said back layer has a top edge, a bottom edge, a left edge, and a right edge, and a pocket coupled to said back layer at the top edge, left edge, and right edge; and wherein said pocket is of sufficient size to secure said mattress pad when said mattress pad is folded or rolled up.

16. A mattress pad of claim 15 wherein said mattress pad has a mattress pad length;
   wherein said pocket has a pocket length shorter than said mattress pad length and
   wherein the pocket length is between about 10% and about 33% of the mattress pad length.

17. A mattress pad of claim 16 wherein the pocket length is between about 15% and about 20% of the mattress pad length.

18. A mattress pad of claim 17 wherein the pocket length is about 16% of the mattress pad length.

19. A mattress pad of claim 15 wherein said mattress pad has a mattress pad length;
   wherein said pocket has a pocket length shorter than said mattress pad length; and
   wherein at least two transverse stitch lines are placed across the width of the mattress pad at intervals approximately equal to the length of the pocket such that the mattress pad, when folded at the transverse stitch lines, fits into said pocket.

20. A mattress pad of claim 1 wherein said back layer has an inner surface facing the middle layer and an outer surface facing outwards, and where the outer surface of the back layer comprises a slip-resistant elastomer.

21. A mattress pad of claim 20 wherein the slip-resistant elastomer is arranged as a pattern of dots on the outer surface of the back layer.

22. A mattress pad of claim 1 wherein said second component layer has a thickness of about 1.5 mm to about 25 mm.

23. A mattress pad of claim 22 wherein said second component layer has a thickness of about 6.5 mm.

24. A mattress pad of claim 1 wherein the first component layer and third component layer are made of the same cushioning material.

25. A mattress pad of claim 24 wherein the second cushioning material has a thickness of about 1.5 mm to about 25 mm.

26. A mattress pad comprising:
a top layer comprised of a first fabric;
a back layer comprised of a second fabric;
a middle layer disposed between said top layer and said back layer; and
wherein said middle layer comprises at least three component layers wherein each said component layer is made of cushioning material;
wherein said middle layer comprising an uppermost component layer adjacent to the top layer and the inner component layer or layers, a lowermost component layer adjacent to the back layer and the inner component layer or layers, and one or more inner component layers adjacent to the uppermost component layer and the lowermost component layer;
wherein each component layer of the middle layer is of uniform thickness and density;
wherein at least one inner component layer consists of perforated viscoelastic polyurethane foam having a thickness of about 1.5 mm to about 25 mm in order to provide a lightweight and compact mattress pad which saves space on an airplane and is sized to fit to an airplane seat.

27. A mattress pad of claim 26 wherein said first fabric and said second fabric are both polyester microfiber fabrics.

28. A mattress pad of claim 27 wherein said top layer and said back layer each comprise 85 GSM 100% polyester microfiber fabric having a thread count of 180.

29. A mattress pad of claim 26 wherein at least one component layer of said middle layer comprises siliconized polyester bonded batting.

30. A mattress pad of claim 26 wherein at least one component layer of said middle layer comprises polyester batting.

31. A mattress pad of claim 26 wherein said back layer has a top edge, a bottom edge, a left edge, and a right edge, and a pocket coupled to the back layer at the top edge, left edge, and right edge; and wherein said pocket is of sufficient size to secure said mattress pad when said mattress pad is folded or rolled up.

32. A mattress pad of claim 31 wherein said mattress pad has a mattress pad length; said pocket has a pocket length shorter than said mattress pad length; and wherein the pocket length is between about 10% and about 33% of the mattress pad length.

33. A mattress pad of claim 32 wherein said pocket length is about 16% of the mattress pad length.

34. A mattress pad of claim 32 wherein said mattress pad has a mattress pad length;
wherein said pocket has a pocket length shorter than said mattress pad length; and
wherein at least two transverse stitch lines are placed across the width of the mattress pad at intervals approximately equal to the length of the pocket such that the mattress pad, when folded at the transverse stitch lines, fits into said pocket.

35. A mattress pad of claim 26 wherein said back layer has an inner surface facing the middle layer and an outer surface facing outwards, and where the outer surface of the back layer comprises a slip-resistant elastomer.

36. A mattress pad of claim 35 wherein the slip-resistant elastomer is arranged as a pattern of dots on the outer surface of the back layer.

37. A mattress pad of claim 26 wherein at least one transverse stitch line is placed across the width of the mattress pad to facilitate folding of said mattress pad.

38. A mattress pad of claim 26 wherein said middle layer is further comprised of at least two component layers comprising polyester batting.

39. A mattress pad of claim 26 wherein said middle layer is further comprised of at least one component layer comprising polyester batting and at least one component layer comprising siliconized polyester batting.

40. A mattress pad of claim 39 wherein said back layer has an inner surface facing the middle layer and an outer surface facing outwards, and where the outer surface of the back layer comprises a slip-resistant elastomer.

41. A mattress pad of claim 40 wherein the slip-resistant elastomer is arranged as a pattern of dots on the outer surface of the back layer.

42. A mattress pad of claim 26 wherein said at least one inner component layer has a thickness of about 6.5 mm.

43. A mattress pad of claim 26 wherein said middle layer has symmetrical construction.

* * * * *